United States Patent [19]

Bitting et al.

[11] 4,199,854
[45] Apr. 29, 1980

[54] CABLE STRIPPING METHOD

[75] Inventors: James L. Bitting; Thomas L. Tubb, Jr., both of Baton Rouge, La.

[73] Assignee: Ethyl Corporation, Richmond, Va.

[21] Appl. No.: 972,978

[22] Filed: Dec. 26, 1978

Related U.S. Application Data

[62] Division of Ser. No. 872,070, Jan. 25, 1978.

[51] Int. Cl.² ............................................. H02G 1/12
[52] U.S. Cl. .................................. 29/426.5; 81/9.51;
29/828; 29/867
[58] Field of Search ............... 81/9.51, 9.5 R; 29/426, 29/427

[56] References Cited

U.S. PATENT DOCUMENTS

| | | | |
|---|---|---|---|
| 3,521,508 | 7/1970 | Kamimura et al. | 81/9.51 |
| 3,832,767 | 9/1974 | Petree | 29/427 |
| 3,895,426 | 7/1975 | Papsdorf | 29/427 |

*Primary Examiner*—Milton S. Mehr
*Attorney, Agent, or Firm*—Donald L. Johnson; John F. Sieberth; Paul H. Leonard

[57] ABSTRACT

An apparatus for stripping a three-wire armor covered, lead jacketed, insulated flat electrical cable comprising a quide roll means for feeding the cable into a stripping means; a stripping means having adjustable cable cutting means for longitudinally cutting the cable in a plurality of places to adjustable depths and die means for stripping the lead jacket and the insulation from the wires; and a pulling means for evenly pulling the cable wires from the guide roll means and through the stripping means.

A method is also provided for stripping the cable, wherein the cable is fed into a stripping means, the cable is longitudinally cut in multiple predetermined places to adjustable depths, the armor cover is removed, and the lead jacket and insulation are removed.

2 Claims, 15 Drawing Figures

CABLE STRIPPING METHOD

This is a division of application Ser. No. 872,070 filed Jan. 25, 1978.

BACKGROUND OF THE INVENTION

The present invention relates to an apparatus for stripping an insulated electric wire. More specifically, the invention relates to an apparatus for stripping a three-wire, armor covered, lead jacketed, insulated electrical cable.

Presently known commercially available cable stripping machines handle one stripping operation at a time. Such machines require considerable handling of the cable and considerable equipment. Such machines are generally designed for high speed operation and require numerous speed controls. The present invention provides a relatively slow speed apparatus which is effective, simple to operate and does not require expensive controls.

Various types of apparatuses have been devised to strip insulated wire. Some of the more recent different types are illustrated by U.S. Pat. Nos. 4,051,749; 3,964,142; and 3,994,188. These devices are all quite different from the instant invention.

Also, such presently known commercially available cable stripping machines cannot handle flat, armor covered, lead jacketed, insulated cable without substantial modification.

It is therefore a primary object of the instant invention to provide an apparatus or assembly which will strip a flat, parallel three-wire, armor covered, lead jacketed, insulated cable in a continuous operation.

Another object of the present invention is to provide a cable stripping apparatus, wherein the various components of the cable such as steel (or other armor), lead (or other similar type jackets), rubber (or other insulation) and copper (or other electrical wire) can be easily reclaimed as separated materials.

A further object of the invention is to provide a cable stripping apparatus which can be easily adjusted to handle various sizes of armored electrical wire or cable.

Still another object of the present invention is to provide a cable stripping apparatus which is relatively inexpensive and which can be easily operated.

Other objects and advantages of the present invention will become more readily apparent from a consideration of the description and drawings hereinafter.

SUMMARY OF THE INVENTION

The present invention is directed to an apparatus for stripping an armored cable or electrical wire, particularly, a flat, parallel three-wire, armor covered, lead jacketed, insulated cable. The apparatus comprises a stripping means which includes cable guiding means, a plurality of adjustable blades or cutting means, an armor removal means, a lead stripping means, and an insulation stripping means, a cable pulling means for pulling the cable from a feed means through the stripping means, and a means for feeding the cable into the stripping means.

DESCRIPTION OF THE PREFERRED EMBODIMENT

Figure 1:
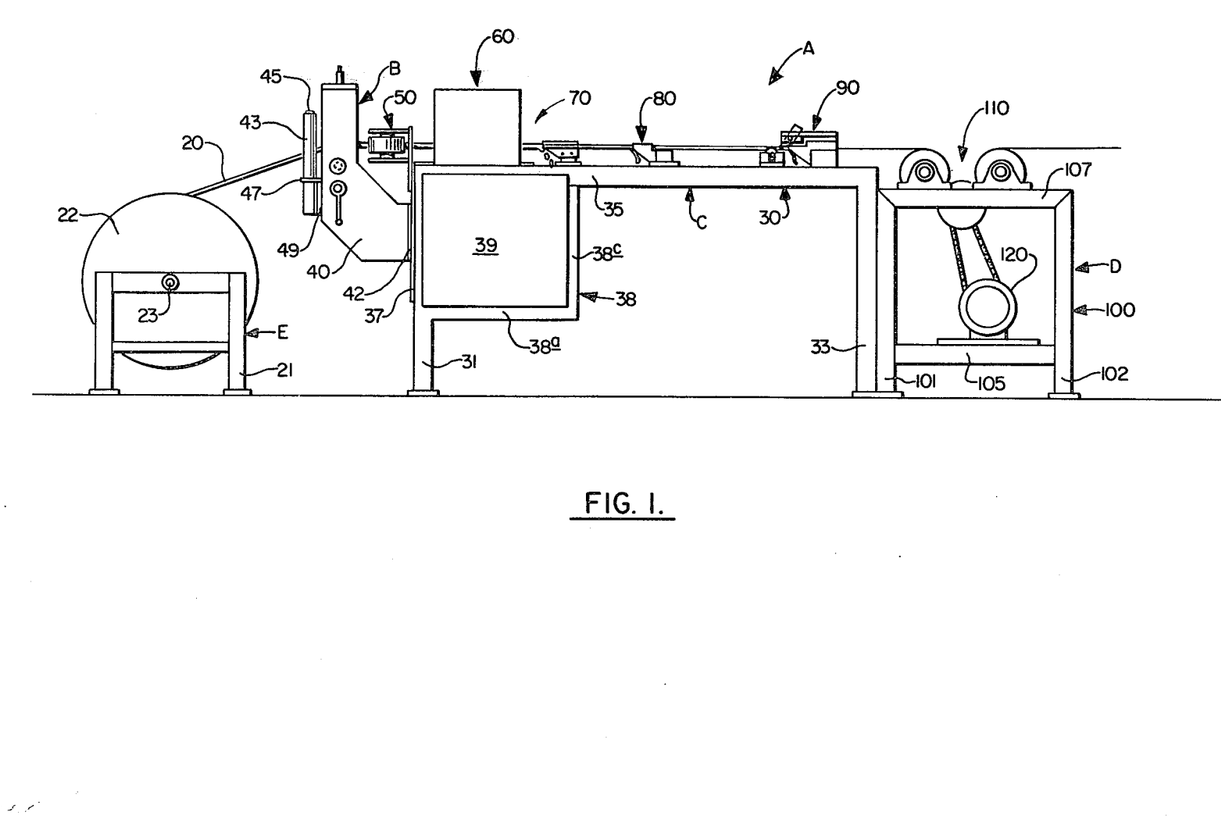
FIG. 1 is a side view of the cable stripping apparatus of the instant invention.
Figure 2:
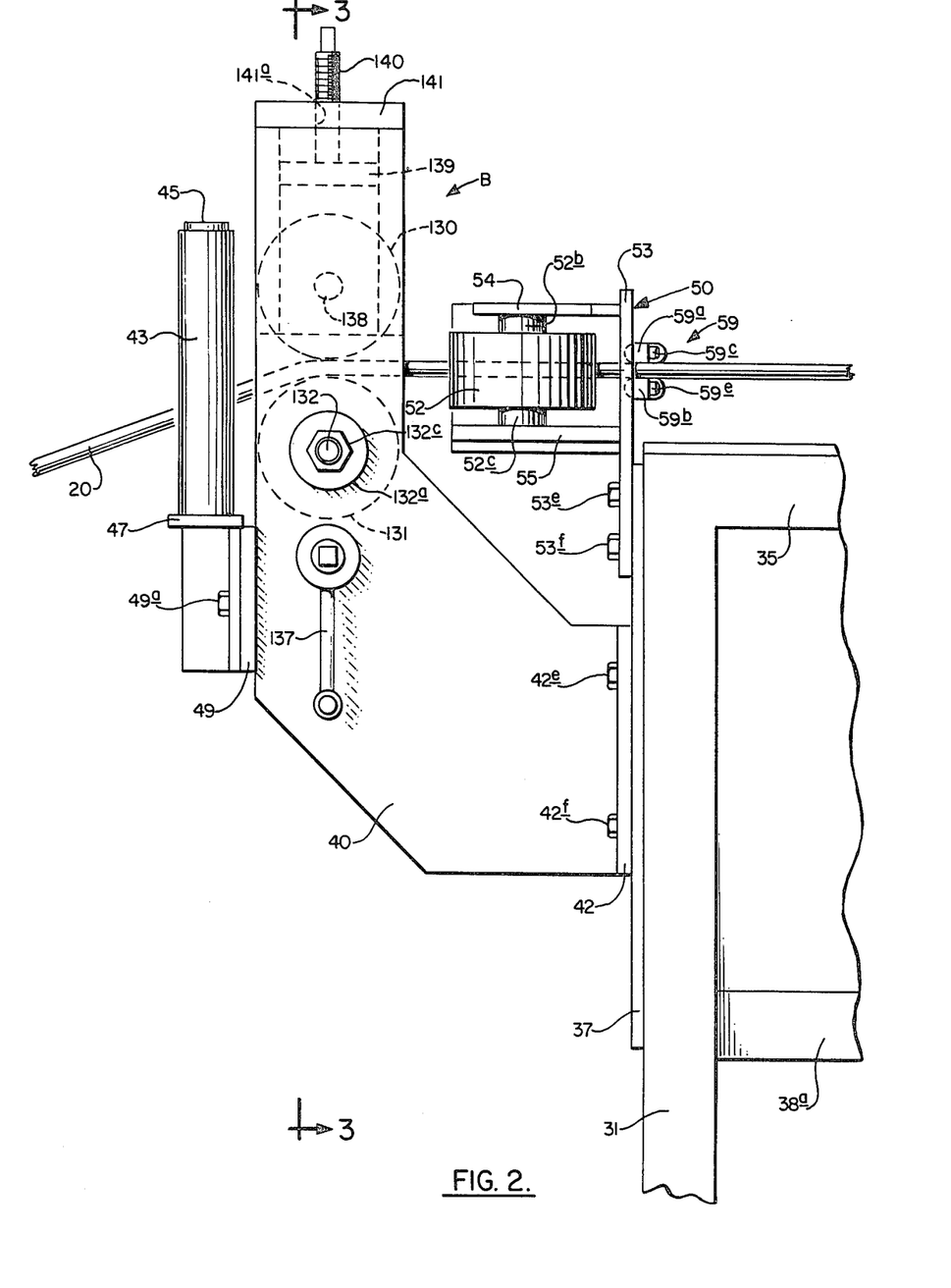
FIG. 2 is an enlarged side view of the guide roll assembly or cable feeding means of the apparatus shown in FIG. 1.
Figure 3:
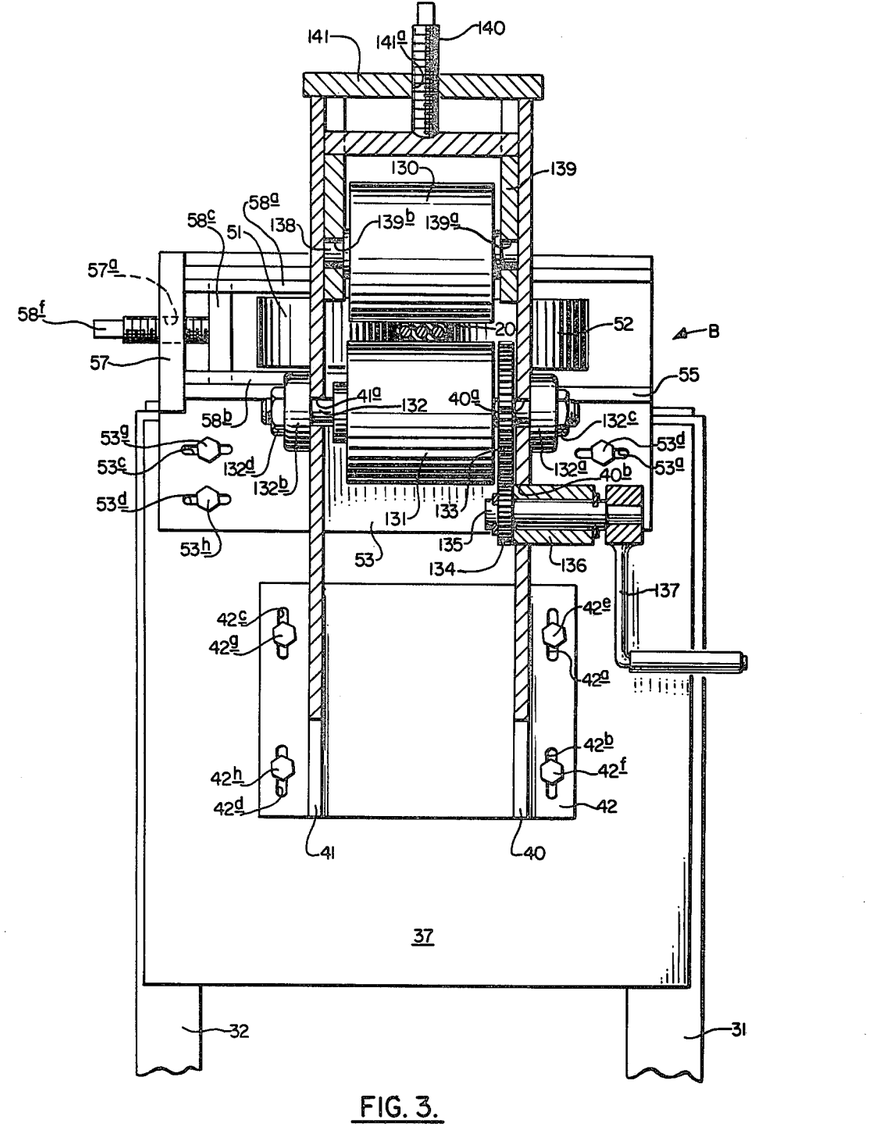
FIG. 3 is a sectional view of the guide roll assembly taken along line 3—3 of FIG. 2.
Figure 4:
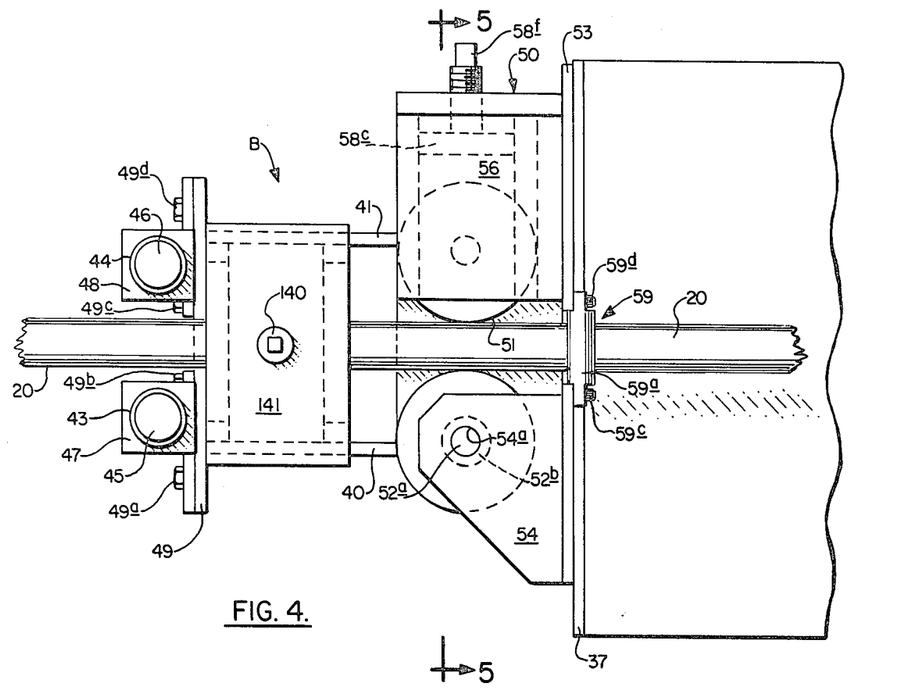
FIG. 4 is an enlarged top plan view of the guide roll assembly.
Figure 5:
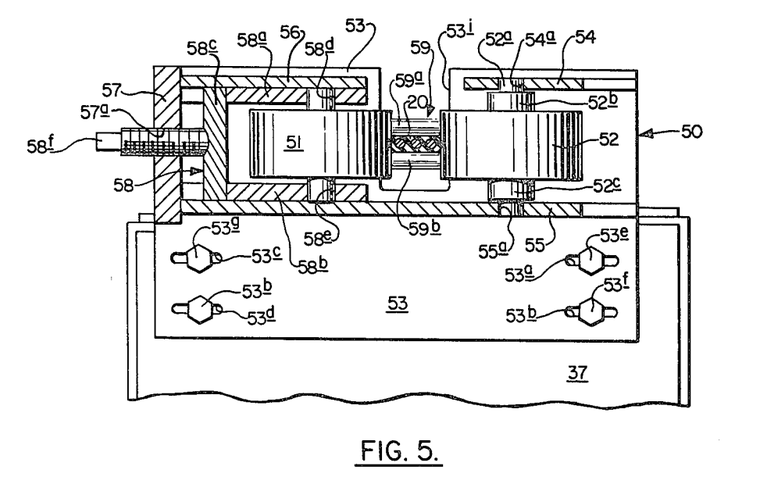
FIG. 5 is a sectional view of the guide roll assembly taken along line 5—5 of FIG. 4.
Figure 6:
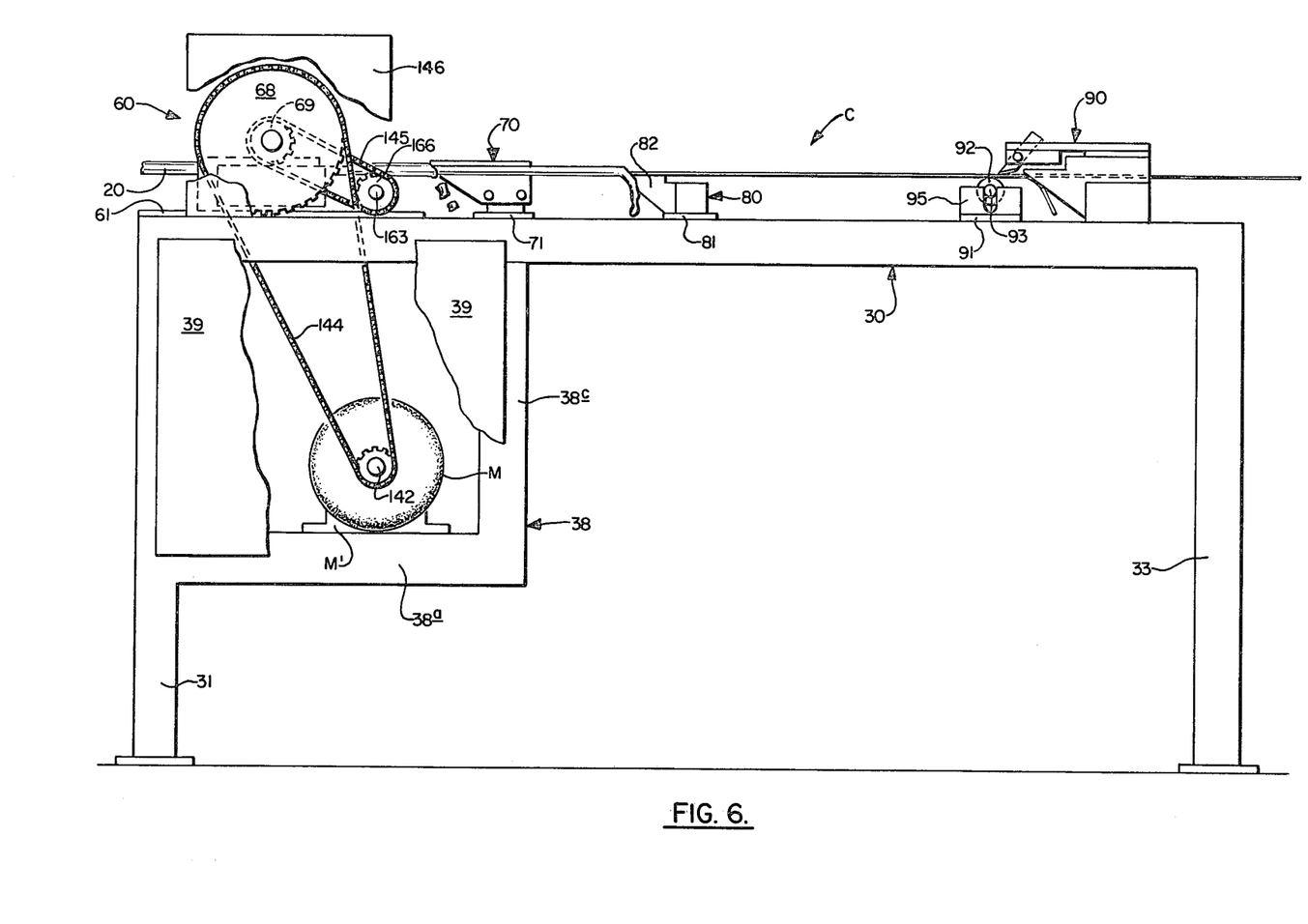
FIG. 6 is an enlarged side view of the stripper means or section of the apparatus shown in FIG. 1.
Figure 7:
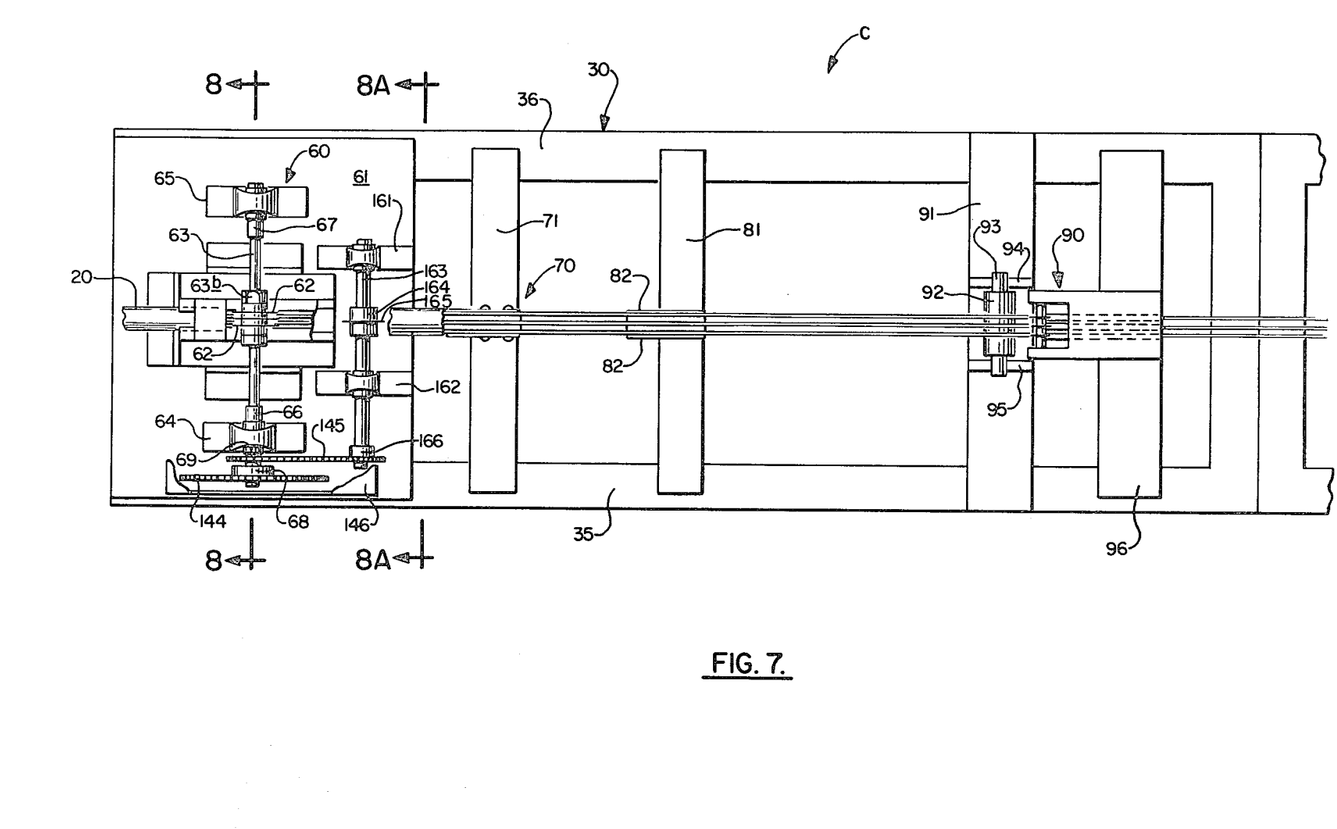
FIG. 7 is an enlarged top plan view of the stripper section of the apparatus illustrated in FIG. 1.

Referring to FIG. 1 of the drawings, the cable stripping apparatus of the present invention is indicated generally at A. The apparatus A comprises three basic components or sections, a guide roll assembly or cable feed means B, a stripper assembly or cable stripping means C and a puller assembly or cable pulling means D. Each of these sections is described in more detail hereinafter.

Although forming no part of the cable stripping apparatus, per se, a cable reel assembly or cable supply means E is schematically shown illustrating one method or means by which a cable 20 may be supplied to the apparatus A. The reel assembly E includes a suitable stand or frame 21 on which a reel 22 containing or holding a supply of cable 20, is rotatably mounted on a removable axle or pin 23 suitably positioned in the frame 21.

The stripper assembly C includes a table or frame 30 having legs 31, 32 (not seen), 33 and 34 (not seen) on which parallel frame members 35 and 36 (not seen) are mounted therein. The frame 30 is preferably constructed from steel such as angle iron members which are welded or otherwise joined together. The frame can be made from any other suitable materials, and should be strong enough to support the various components mounted or attached thereon. A plate 37 is bolted to the outside of legs 31 and 32 and the guide assembly B is mounted thereon. A motor support frame 38 is welded to the underside of the frame 30 and comprises horizontal members 38a and 38b (not seen) and vertical members 38c and 38d (not seen). Horizontal members 38a and 38b are attached to table legs 31 and 32, respectively, and to vertical members 38c and 38d, respectively. Vertical members 38c and 38d are attached to frame members 35 and 36, respectively. A protective cover 39 is suitably attached to the motor support frame 30 and covers the moving parts of a motor mounted on the frame 30.

The guide roll assembly B includes a pair of somewhat L-shaped support brackets 40 and 41 (not seen) welded to a rectangular plate 42 which is bolted on plate 37. A pair of adjustable guide rollers 43 and 44 (not seen) are positioned on rods 45 and 46 (not seen), respectively, which are welded to support brackets 47 and 48 (not seen), respectively, which are welded to plate 49 welded to and joining support brackets 40 and 41. A guide and straightening roller assembly 50 is bolted on the upper portion of the plate 37 above the brackets 40 and 41.

The stripper assembly C comprises an armor cutting section or unit 60, an armor removal or peel off unit 70, a lead shield removal unit 80, and an insulation or rubber stripper unit 90, each of which are mounted on the frame 30.

The puller assembly D is positioned adjacent stripper assembly C and comprises a frame 100, a cable pulling unit 110 mounted thereon and a motor 120 mounted on the frame 100 for driving the pulling unit 110. The frame 100 is also preferably constructed of steel or other suitable materials and includes legs 101, 102, 103 and 104 jointed together by lower frame members 105 and 106 and upper frame members 107 and 108. Pulling unit 110 is mounted on upper frame members 107 and 108, and motor 120 is mounted on lower frame members 105 and 106.

Referring now to FIGS. 2, 3, 4 and 5, the guide roll assembly or section B is illustrated in more detail. Support brackets 40 and 41 are welded to rectangular plate 42 which is welded to legs 31 and 32. Plate 42 has a plurality of slots or openings 42a, 42b, 42c and 42d thereon for receiving the bolts 42e, 42f, 42g and 42h, respectively. Plate 42 is bolted to support plate 37 by means of the hex bolts and corresponding nuts (not seen). Plate 37 has suitable openings (not seen) therein for receiving bolts 42e, 42f, 42g and 42h, respectively. The slots in plate 42 enable the brackets 40 and 41 to be vertically adjusted as required or desired.

Plate 49 is welded to support brackets 40 and 41 and has suitable openings (not seen) therein for receiving bolts 49a, 49b, 49c and 49d. Rod support brackets 47 and 48 also have suitable bolt receiving openings therein. Brackets 47 and 48 are bolted to plate 49 by bolts 49a and 49b and bolts 49c and 49c, respectively, and corresponding nuts (not seen) on each bolt.

Guide rollers 43 and 44 are merely slipped over rods 45 and 46, respectively, and supported by brackets 47 and 48, respectively. The guide rollers freely rotate about their respective rods. Preferably, the openings in support brackets 40 and 41 are longitudinal ones and permit the rollers to be adjusted for the width of a particular cable 20.

An adjustable upper roller 130 and a fixed lower roller 131 are positioned oppositely and spaced apart from each other and between support brackets 40 and 41. Roller 131 is rotatably mounted on threaded bolt or pin 132 in which the ends thereof are inserted in openings or holes 40a and 41a. The ends of bolt 132 extend sufficiently outward from brackets 40 and 41 to receive flange bushings 132a and 132b and nuts 132c and 132d. A gear 133 is fixed to roller 131 and positioned on pin 132 between the roller 131 and support bracket 40. A small gear 134 is positioned below roller 131 and below gear 133 so as to mesh with the latter. Gear 134 is attached to axle 135 so as to rotate with it. Axle 135 is positioned in bushing 136 which is inserted in opening 40b or bracket 40. A removable hand crank or handle 137 is attached to the exterior end of axle 135. Axle 135 may be moved inwardly so as to move gear 134 out of mesh with gear 133.

Adjustable roller 130 is rotatably mounted on axle or pin 138 which is installed on yoke 139. The ends of axle 138 are inserted in openings 139a and 139b in yoke 139. A set screw 140 is fixed in the upper end of yoke 139 and is threadedly engaged with yoke support 141 by means of threaded opening 141a. Rotation or turning of screw 140 permits yoke 139 and upper roller 130 to be raised or lowered as desired.

Guide straightening and roller assembly 50 includes a movable guide and straightening roller or wheel 51 and fixed guide and straightening roller or wheel 52. Assembly 50 is attached to plate 37 on frame 30 by means of plate or support member 53. Plate 53 has a plurality of bolt receiving slots 53a, 53b, 53c and 53d. The plate 53 is attached to plate 37 by means of hex bolts 53e, 53f, 53g and 53h, which are inserted in their respective slots in plate 53 and openings therefor in plate 37 and suitable nuts. The slots in plate 53 permit the plate 53 to be fixed in a desired position.

Upper horizontal bracket 54 and lower horizontal bracket 55 are welded to plate 53 and provide the support for fixed wheel 52. A pin or axle 52a is inserted in hole 54a in bracket 54 and hole 55a in bracket 55. Wheel 52 and bushings 52b and 52c are positioned on axle 52a.

A horizontal bracket 56 and a vertical bracket 57 are also welded to the plate 53 and these brackets along with lower horizontal bracket 55 provide the support for movable yoke 58. Yoke 58 includes a pair of arms 58a and 58b joined together in a parallel spaced apart relationship by member 58c. Openings 58d and 58e are provided in their respective arms or brackets 58a and 58b for receiving the ends of axle or pin 51a on which wheel 51 is positioned. A set screw 58f is fixed in member 58c and is threadedly engaged with bracket 57 by means of threaded hole 57a. Rotation of screw 58f moves yoke 58 and wheel 51 inwardly or outwardly as desired.

Plate 53 has a relatively large slot or channel 53i cut therein and in alignment with the space between wheels 51 and 52 for allowing cable 20 to pass therethrough.

A cable hold down guide or guide means 59 comprises a pair of spaced apart bars or members 59a and 59b with bolt receiving openings on each end thereof and which are attached to plate 53 by bolts or other suitable means. Plate 53 has slotted openings therein for receiving bolts 59c and 59d in upper bar 59a and bolts 59e and 59f (not seen) in lower bar 59b. The slotted openings in plate 53 enable the guide means 59 to be suitably adjusted to receive cable 20 in the desired alignment. Cable 20 passes through channel 53i in plate 53 and between upper guide bar 59a and lower guide bar 59b.

Referring now to FIGS. 6, 7, 8 and 8A, stripper assembly C includes armor cutting unit 60, armor removal unit 70, lead shield removal unit 80 and rubber stripping unit 90, and motor M and associated parts for driving unit 60 all of which are suitably mounted on table 30.

Cutting unit 60 is mounted on base plate or support member 61 which is suitably fixed on upper frame members 35 and 36 of frame 30. Circular saw blades 62 are mounted on shaft 63. The blades are in parallel alignment with each other and spaced apart to provide a desired cutting location. Locking nuts 63a and 63b are provided for locking the blades on the shaft. Shaft 63 is positioned in pillow blocks 64 and 65 which are suitably attached to plate 61. Roll pins 66 and 67 are suitably attached to each end of shaft 63 and inserted in pillow blocks 64 and 65, respectively. A large chain sprocket 68 is attached to one end of shaft 63 and held thereon by set screw 68a. A small chain sprocket 69 is also attached on shaft 63 between sprocket 68 and block 64.

Also mounted on plate 61 are pillow blocks 161 and 162 with shaft 163 positioned therein. A movable collar 164 with circular saw blade 165 fixed thereon is installed on shaft 163 between pillow blocks 161 and 162. The collar and blades may be moved along the shaft to position the blade in a desired cutting position. A small chain sprocket 166 is attached to one end of the shaft 163 exterior of pillow block 162 and in alignment with small sprocket 69.

Motor M in motor mount M' on frame support members 38a and 38b has a drive shaft 142 on which chain sprocket 143 is attached to an end thereof. Sprocket 142 and sprocket 68 are operably connected together by chain 144. Sprocket 69 and sprocket 166 are operably joined together by small chain 145.

The motor M is preferably an electrical one and includes suitable electrical connections and switches therefor. The motor could also be a gasoline type or any other suitable type. Motor M and its associated shafts, sprockets, chains and related parts provide the driving force for rotating cutting blades 62 and cutting blade 165. Motor cover 39 and sprocket cover 146 provide protective shielding of moving parts.

Cutting unit 60 also includes a cable guide unit or assembly 150 (FIG. 8) which is mounted in plate 61 below cutting blades 62. The unit 150 comprises an adjusting block 151 with adjusting screw 152 threadedly engaged therein by means of threaded opening 151a. Screw 152 extends through an opening 61a in plate 61 and is removably attached to cable guide 153 by means of bearing 154. Four coil springs 155 are inserted in channels or openings 154a therefor in cable guide block 153. A cable guide 156 is positioned on cable guide block 153. Guide 156 has a channel 156a therein for receiving cable 20. The cable guide 156 is cut and sized for the particular size cable to be stripped. It is removable, and cable guides suitable for use with other size cables can be substituted therefor.

Figure 8:
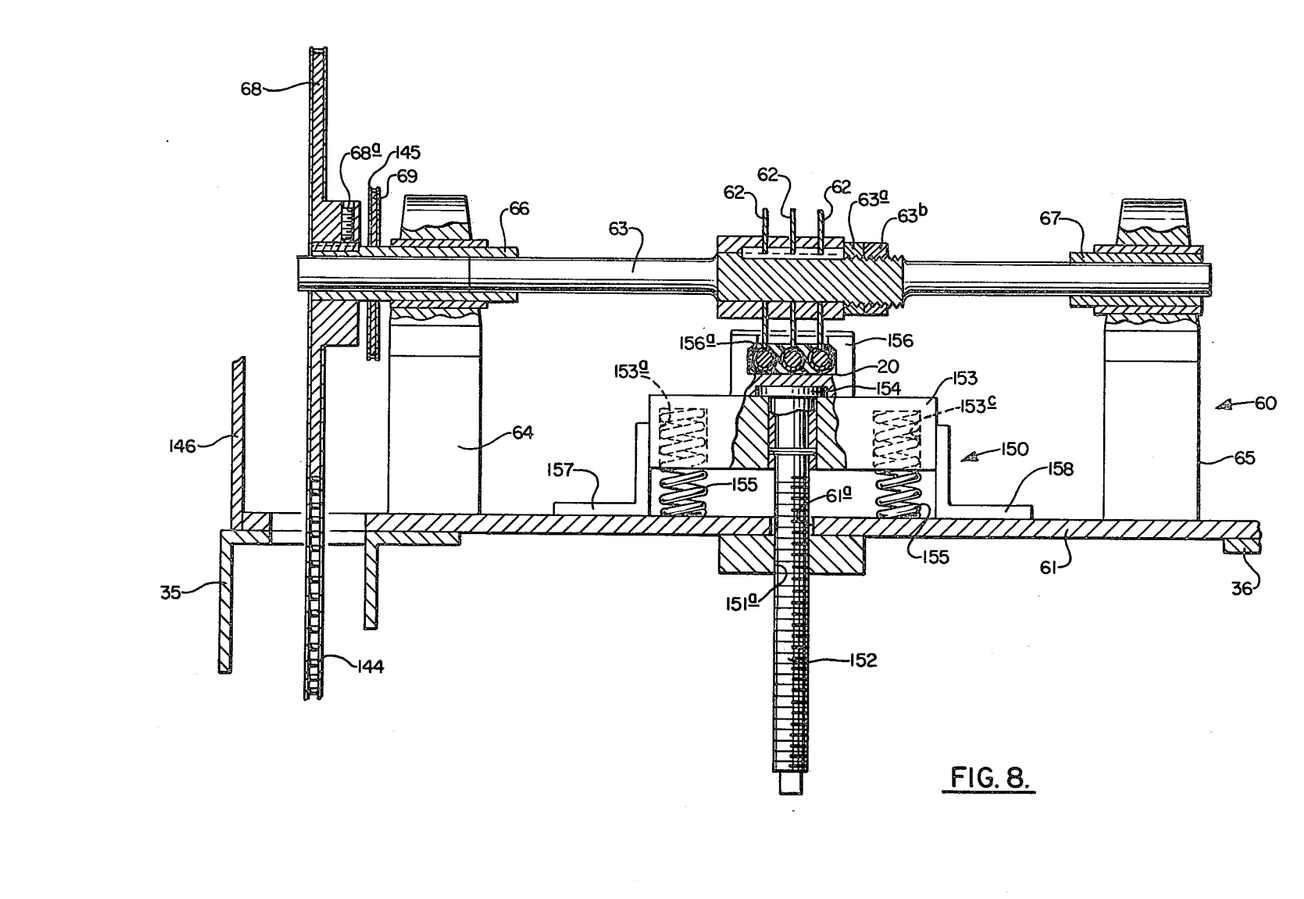
FIG. 8 is a sectional view of the stripper section taken along line 8—8 of FIG. 7.
Figure 8A:
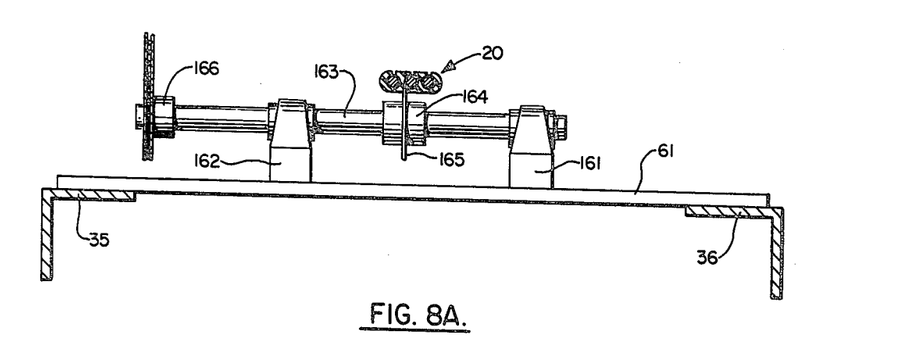
FIG. 8A is a sectional view of the stripper section taken along line 8A—8A of FIG. 7.

Angle iron guide members 157 and 158 are attached to the upper side of plate 61 and retain cable guide block 153 in position and enable said block to be moved vertically within the confines thereof.

Figure 13:
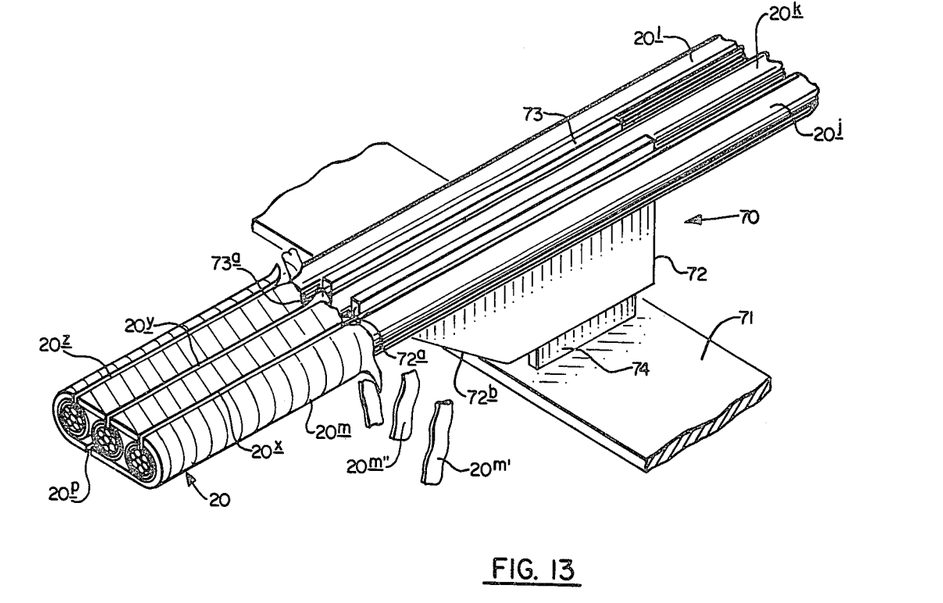
FIG. 13 is an enlarged perspective view of the armor removal unit and a portion of the cable after passing through the cutting unit showing the steel armor being removed.

Armor removal unit 70 is mounted on bar 71 attached to frame members 35 and 36 and in alignment with cutting blades 62 and 165. As best seen in FIG. 13, the armor removal unit 70 comprises a pair of parallelledly spaced apart armor stripping members 72 and 73 bolted or otherwise suitably attached to mounting members 74 and 75 (not seen), respectively, suitably fixed or positioned on the bar 71. Stripping members 72 and 73 are substantially identical. Member 72 has a more or less flat face 72a for contacting and stripping away the outer steel armor of the cable 20. Preferably, the member 72 also has a tapered edge 72b. The members 72 and 73 are so positioned in relation to each other and the cable 20, that as the cable 20 is pulled toward the unit 70, the steel armor is stripped from the cable so as to divide the cable into its three separate lead jacketed wires. One wire passes outwardly of the member 72, one wire passes outwardly of member 73 and the center wire passes between the members 72 and 73.

Figure 11:
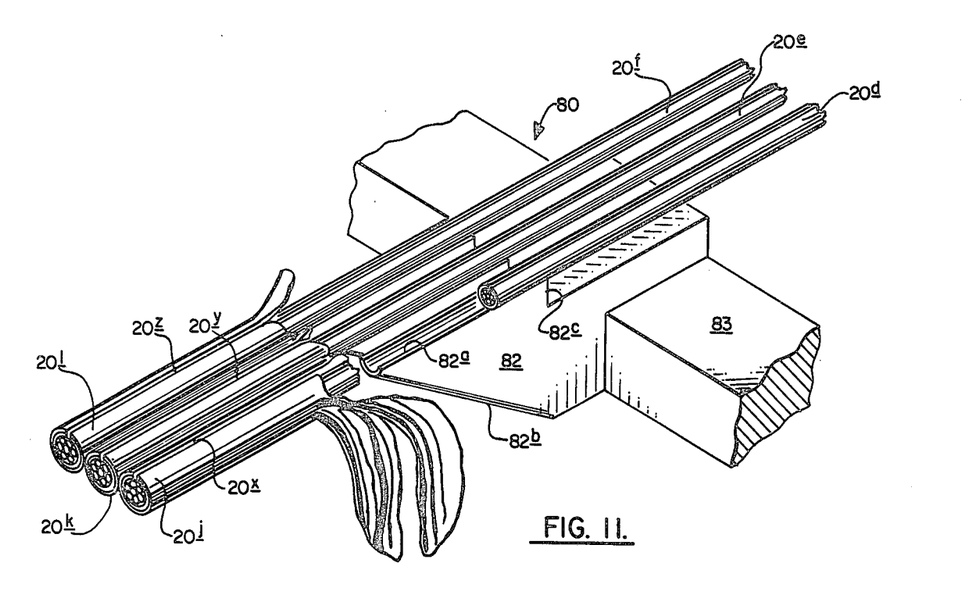
FIG. 11 is an enlarged perspective view of the lead stripping die and a partially stripped cable at an intermediate stage of the stripping operation showing a portion of the cable after the armor (steel) has been removed, the lead jacket being removed and after the lead jacket has been removed.

Lead shield removal unit 80 is mounted on bar 81 attached to frame members 35 and 36. As best seen in FIG. 11, unit 80 includes three spaced apart lead stripping members 82 removably secured by screws or other suitable means to support bar 83. Each of the members 82 has a semi-circular shaped channel or groove 82 extending across the upper side thereof which is sized for the cable being stripped. Different size lead stripping members are used for different sizes of cable. One edge or face 82b of the members 82 is tapered or slanted. The members 82 also preferably have a notched or cut-out portion 82c on the upper edge thereof.

Rubber stripping unit 90 includes bar 91 suitably attached to frame members 35 and 36 with roller 92 mounted on shaft 93 the ends thereof which are removably positioned in suitable openings in shaft support members 94 and 95. Roller 92 has three parallel grooves therein sized to the particular sized cable of which the rubber or insulation is to be stripped therefrom.

The unit 90 also includes bar 96 on which three rubber stripping means 97 (FIG. 12) are attached thereto in a spaced apart parallel relationship. Rubber strippers 97 are also sized to the particular cable being stripped. Various size strippers may be interchanged as desired. Each of the members 97 has a somewhat pointed edge 97a which is shaped so as to strip the rubber from the cable wires. The other stripping members 97 are substantially identical and are positioned on the bar 96 in a parallel and spaced apart manner so that each edge 97a will strip the rubber insulation from the three rubber insulated wires as the wires are pulled past the strippers 97.

Figure 12:
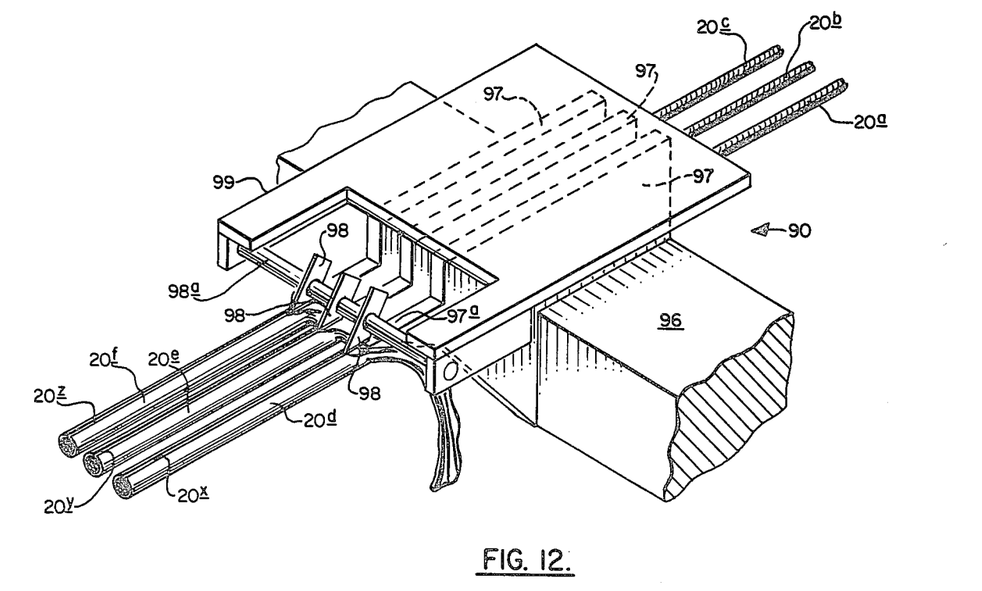
FIG. 12 is an enlarged perspective view of the insulation stripping die and a portion of the cable just prior to the insulation being removed, the insulation being removed and the cable wires after stripping has been completed.

Preferably, the stripping unit 90 also includes three cutting blades 98 which are mounted paralleledly and spaced apart on a shaft 98a in the somewhat U-shaped mounting bracket 99 positioned on top of the members 97 and attached to bar 96. The blades 98 are positioned so that they are aligned with the saw cuts in the insulation on the respective wires directed there towards. The blades 98 assure that the rubber insulation is fully cut should the saw cuts be inadequate for subsequent stripping of the cable.

Figure 9:
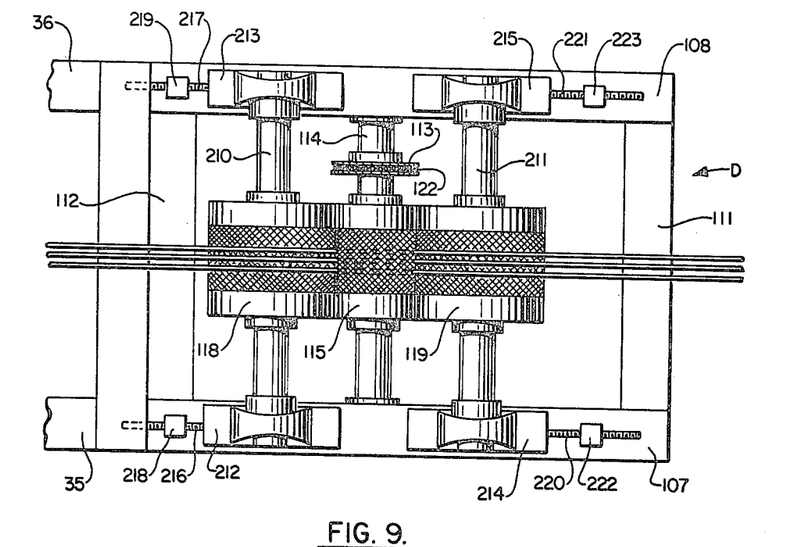
FIG. 9 is an enlarged top plan view of the cable pulling means or section of the apparatus of FIG. 1.
Figure 10:
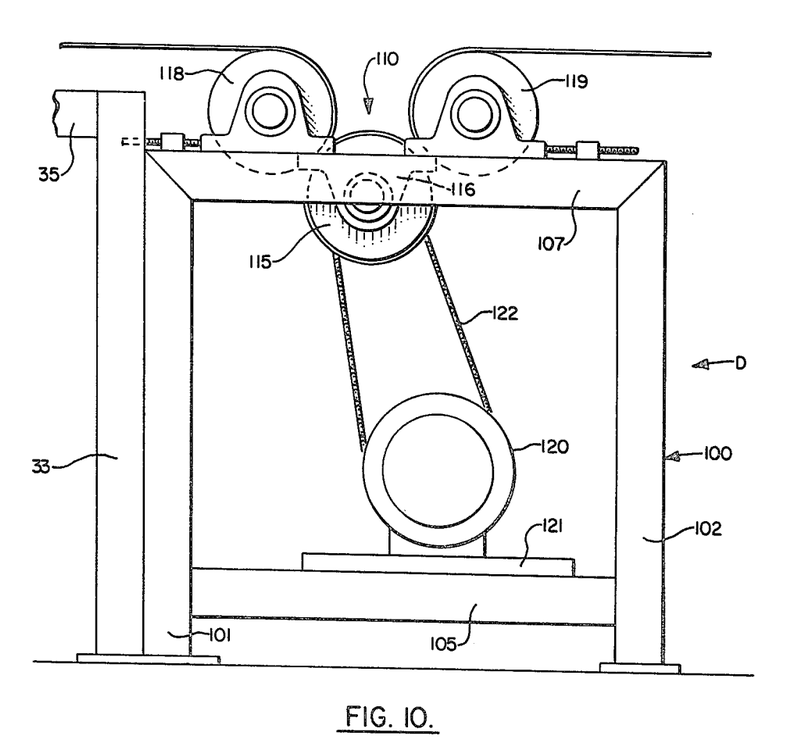
FIG. 10 is an enlarged side view of the cable pulling section of the apparatus of FIG. 1.

Referring now to FIGS. 9 and 10, puller assembly D comprises frame 100, pulling unit 110 and motor 120. Frame 100 is positioned adjacent from 30, particularly adjacent legs 33 and 34 thereof, and includes legs 101, 102, 103 (not seen) and 104 (not seen), lower frame members 105 and 106 (not seen), upper frame members 107 and 108 (not seen) and upper cross members 111 and 112. Legs and frame members not seen are comparable to their opposite leg or member shown.

Motor 120 is supported by motor unit 121 fixed to frame members 105 and 106. The motor is preferably an electric one, but could be any suitable type, such as a gasoline motor or other type. The motor also includes the usual electrical connections and switches necessary for the operation thereof. The motor 120 has a drive shaft on which is mounted a sprocket. A chain 122 is connected to the motor sprocket and to pulling unit sprocket 113 mounted on shaft 114. Drive roller 115 is positioned on shaft 113. Roller 115 has a knurled surface thereon. Shaft 113 is positioned in pillow blocks 116 and 117 attached to the underside of angle frame members 107 and 108, respectively.

Pulling unit 110 also includes a pair of upper rollers 118 and 119 mounted on shafts 210 and 211, respectively. Shaft 210 is supported by pillow blocks 212 and 213 positioned on the upper side of frame members 107 and 108, respectively. Shaft 211 is supported by pillow blocks 214 and 215 also positioned on the upper side of frame members 107 and 108, respectively. Pillow blocks 212 and 213 are attached to turnbuckle screws 216 and 217, respectively, which are threadedly engaged in turnbuckle mounts 218 and 219, respectively fixed to the upper sides of frame members 107 and 108, respectively. Pillow blocks 214 and 215 are attached to turnbuckle screws 220 and 221, respectively, which are threadedly engaged in screw mounts 222 and 223 also attached to the upper sides of members 107 and 108, respectively. Rotation of the various turnbuckle screws moves the rollers 118 and 119 horizontally and inwardly or outwardly as desired.

The cable to be stripped is a three-wire armor covered, lead jacketed, insulated flat cable. Such a 3-phase wire armored cable typically includes three multistrand copper wires individually insulated in the usual manner with rubber such as EPDM. The three insulated wires are encased or surrounded by a lead jacket. Around the lead jacket is a braided material such as a woven cloth. Around the woven cloth is an insulating tape such as PVFT. Finally, the entire assembly is encased or surrounded by an armored jacket of steel. In some instances, an insulating tape may also be wrapped around the steel armor.

Figure 14:
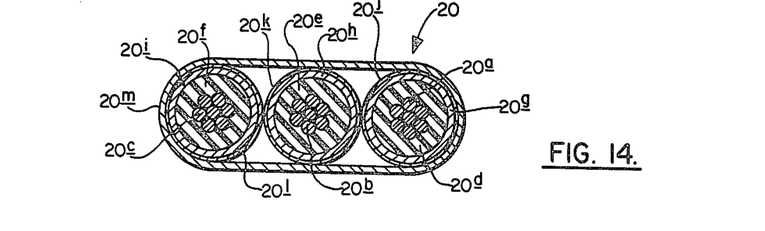
FIG. 14 is an enlarged sectional view of the electrical cable prior to stripping operations.

As seen in FIG. 14, the cable 20 includes three separate multi-strand wires 20a, 20b and 20c. Each of the wires is covered with rubber or other suitable insulation 20d, 20e and 20f, respectively. Around the rubber on each wire is lead jackets 20g, 20h and 20i, respectively. Around the lead jackets of each wire is an insulated tape covered woven or braided cloth 20j, 20k and 20l, respectively. Finally, a steel armor 20m encases or surrounds the three covered wires. In the drawing, some of the components of the cable are exaggerated for purposes of illustration. Such types of cables are well known in the art.

It can be appreciated that such a cable may be manufactured in a variety of ways using various materials. Basically though such cable includes three insulated electric wires which are separately encased in a lead jacket and which lead jacketed wires are protected by an outer armor. For purposes herein, the term "cable" means any type of lead jacketed, armored cable. The terms "copper wire" or "wire" means any suitable wire of one or more strands of electric conducting material. The terms "rubber insulation" or "rubber coated", "rubber" or any combination thereof means any suitable insulation material placed around the copper wires. The term "lead jacket" means any type of jacketing material encasing the insulated copper wires such as lead, lead alloy or similar types of materials. The term "armor" or "steel" or any combination thereof means the outer protective casing or covering which is made of steel or any other suitable materials. The term "woven cloth" means any type of braided material or other material which may be used for such purpose. The term "tape" means any type of insulating or other tape which may be used for such purpose.

Although the apparatus illustrated is particularly constructed for stripping a 3-phase armored cable, it can be appreciated that the apparatus can be readily varied to strip a cable having any number of wires. More or less cutting or saw blades, lead stripping members or dies, lead shield removal members and rubber stripping members can be installed as desired. Parts of the apparatus necessary to handle a particular size of cable can readily be installed.

In the operation of the apparatus of the instant invention, the apparatus must first be adjusted to handle the stripping operation of a particular size armored cable.

In the guide roller assembly 50, adjustable guide rollers 43 and 44 are positioned so that they are spaced apart sufficiently to enable the cable 20 to be guided thereby and readily pass therebetween. Upper roller 130 is vertically adjusted so that the cable will be guided by and readily move between rollers 130 and 131, over lower roller 131 and under upper roller 130. Movable roller 51 is horizontally adjusted so that the cable may be guided by and readily moved between roller 51 and fixed roller 52. The cable also passes through hold down guide 59. With the foregoing adjustments, the assembly 50 is ready to guide the cable 20 into the proper position for cutting and stripping operations.

In the armor cutting unit 60, the three saw blades 62 are positioned so that three parallel and suitably spaced apart cuts may be made longitudinally in the cable 20 so as to cut from the upper side of the cable down to the copper wire, i.e., so as to make three distinct cuts through all parts of the cable except the copper wire. The fourth saw blade 165 is adjusted so that the cable may be cut longitudinally from the bottom through the steel armor. This latter cut is preferably made more or less in the center of the cable; however, such center position is not critical. A cable guide 156 of a proper size to guide the cable 20 therethrough is positioned under the blades 62. The guide 156 is adjusted to proper height for cutting the cable by means of adjusting screw 162 which raises or lowers cable guide block 153 as necessary.

Armor removal unit 70 is positioned so that the steel armor may be removed from the cable 20 after the cable has been cut by blades 62 and 165.

The lead shield removal unit is adjusted so that the lead shield around the cable 20 may be stripped therefrom after the cable has passed through the armor removal unit 70.

Rubber stripping unit 90 is also adjusted to a proper position to enable the rubber insulation to be stripped from the cable 20 after the cable has passed through the lead shield removal unit 80.

After the various components of the apparatus A have been adjusted or positioned for receiving and handling a particular size of flat armored cable, one end of the cable 20 is fed from the reel 22 between guide rollers 43 and 44 and between rollers 130 and 131. The roller 131 is then turned by means of hand crank 137 and drives the cable 20 forward between rollers 51 and 52 and into cutting position. Motor M is actuated so that the rotary blades 62 and 165 make the desird cuts in the cable. The cable is then pulled thru the armor removal unit 70, which strips the steel armor from the cable as it is moved forward. The cable is pulled forward thru the lead shield removal unit 80 which strips the lead shield from the cable. The cable is then hand stripped of the rubber and fed thru the rubber stripping unit 90. The cable is pulled forward and the three wires are fed into the pulling unit D. The wires are fed over the roller 118, under roller 115 and over roller 119. The rollers 115, 118 and 119 are adjusted so that the 3 wires are firmly held and can be moved therethrough. Operation of the motor 120 drives rollers which pull the wires forward where they can be wound on a suitable reel or other container.

Once the wires are positioned in the pulling unit, operation of the motor 120 causes the cable to be pulled from the reel 22 and through the various cutting and stripping operations. The operation is continued until all or a desired amount of cable is stripped.

As best seen in FIG. 13, a portion of the cable 20 is illustrated after the cable has passed through the armor cutting unit 60. The saw blades 62 have made three distinct cuts 20x, 20y and 20z from the top down through armor 20m, through taped cloth 20j, 20k and 20l, through lead jackets 20g, 20h and 20i, through rubber insulation 20d, 20e and 20f, and to wires 20a, and 20b and 20c. Saw blade 165 has made bottom cut 20p which extends thru armor 20m.

As the cable 20 is pulled past the armor stripping unit 70, the faces 72a and 73a and of the members 72 and 73, respectively, force the armor 20m from the cable 20 so as to fall away in pieces 20m', 20m'', etc. Three separate covered wires as illustrated by taped cloth covering 20j, 20k and 20l emerge from the unit 70.

As seen in FIG. 11, the three separate taped cloth covered wires 20j, 20k and 20l are pulled through the lead shield removal unit 80 so as to strip lead jackets 20g, 20h and 20i and their respective covering 20j, 20k and 20l from the wire. Three separate rubber covered wires as illustrated by rubber insulating 20d, 20e and 20f emerge from the unit 80.

As seen in FIG. 12, the multi-stranded wires 20a, 20b and 20c are pulled thru the rubber stripping unit 90, rubber insulations 20d, 20e and 20 are removed. Blades 98 are positioned so that a blade is aligned with each of the cuts 20x, 20y and 20z, respectively. Each blade cuts any rubber not cut by the saw blades 62 down to the wires 20a, 20b and 20c, respectively. This assures that all rubber insulation will be stripped from the wires.

The apparatus A enables flat armored cable to be completely stripped with relative ease. Adjustments can readily be made to handle a particular size cable.

The foregoing disclosure and description of the invention is illustrative and explanatory thereof and various changes in the size, shape and materials, as well as in the details of the illustrated construction, may be within the scope of the appended claims without departing from the spirit of the invention.

We claim:

1. A method of stripping or removing the outer insulating casing from a multi-wire armor covered, lead jacketed, insulated flat electrical cable comprising the steps of:
    a. Feeding the cable through a guide means into a means for making a plurality of longitudinal cuts in the cable;
    b. Making a plurality of longitudinal cuts to predetermined depths in the cable, a plurality of said cuts being made paralleledly and spaced apart from the top down through the armor, through the lead jacket, through the insulation and down to the wire, and at least one of said longitudinal cuts being made from the bottom through the armor;
    c. Moving the cable with the longitudinal cuts therein through an armor stripping means and stripping the armor from the cable thereby reducing the cable to a plurality of individual lead jacketed wires;
    d. Moving the individual lead jacketed wires through a lead jacket stripping means and removing the lead jacket from each of the individual wires thereby reducing each individual wire to an insulation covered wire; and
    e. Moving the individual insulation covered wires through an insulation stripping means and removing the insulation from each of the individual wires thereby reducing each individual wire to a wire substantially stripped of all outer coverings.

2. The method of claim 1, wherein a portion of the wire is stripped to form a plurality of stripped wires on one end of the cable and the stripped wires are positioned in a pulling means and the cable is then pulled through the various cutting and stripping operations.

* * * * *